May 12, 1959 J. L. PRESLER 2,886,334
ROTARY SCATTERER
Filed Sept. 9, 1953 2 Sheets-Sheet 2
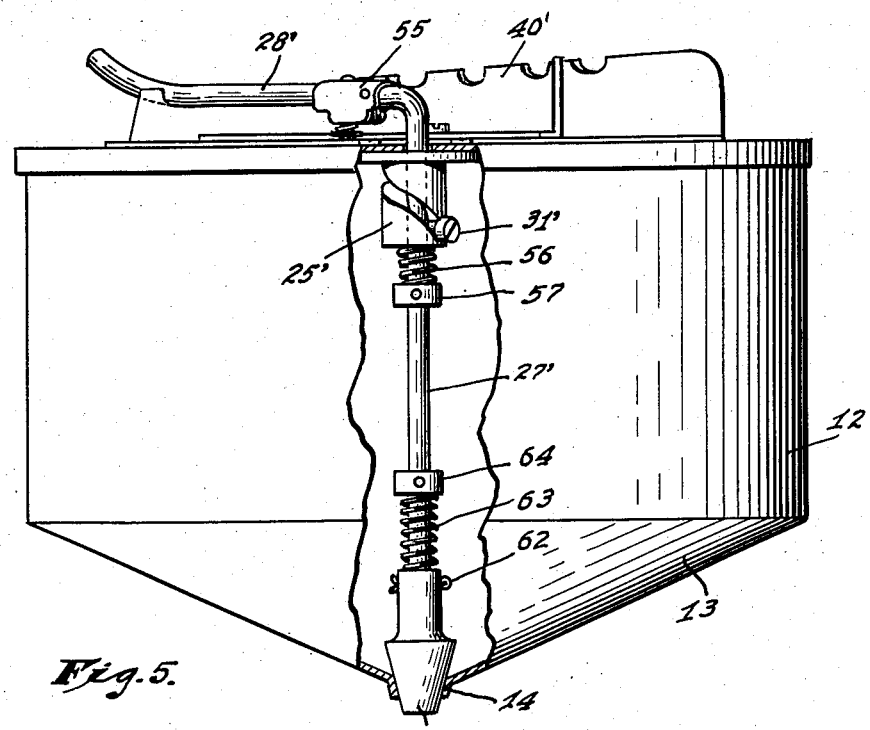
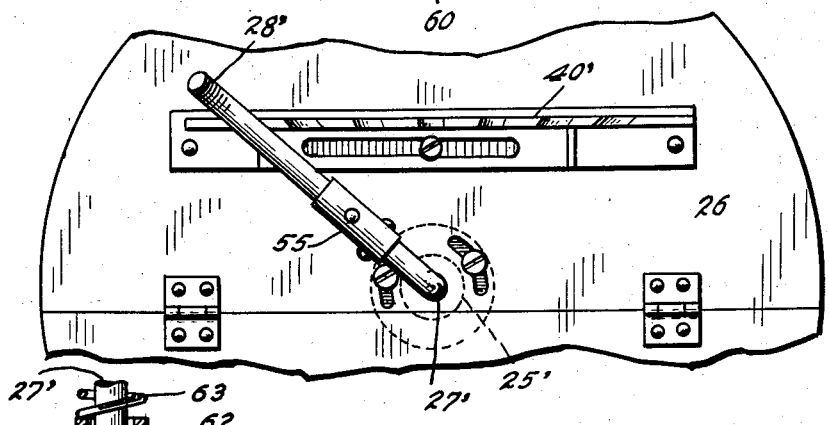
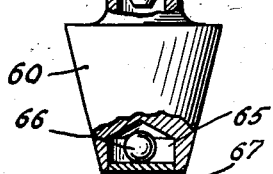
INVENTOR.
JAMES L. PRESLER,
BY
ATTORNEYS.

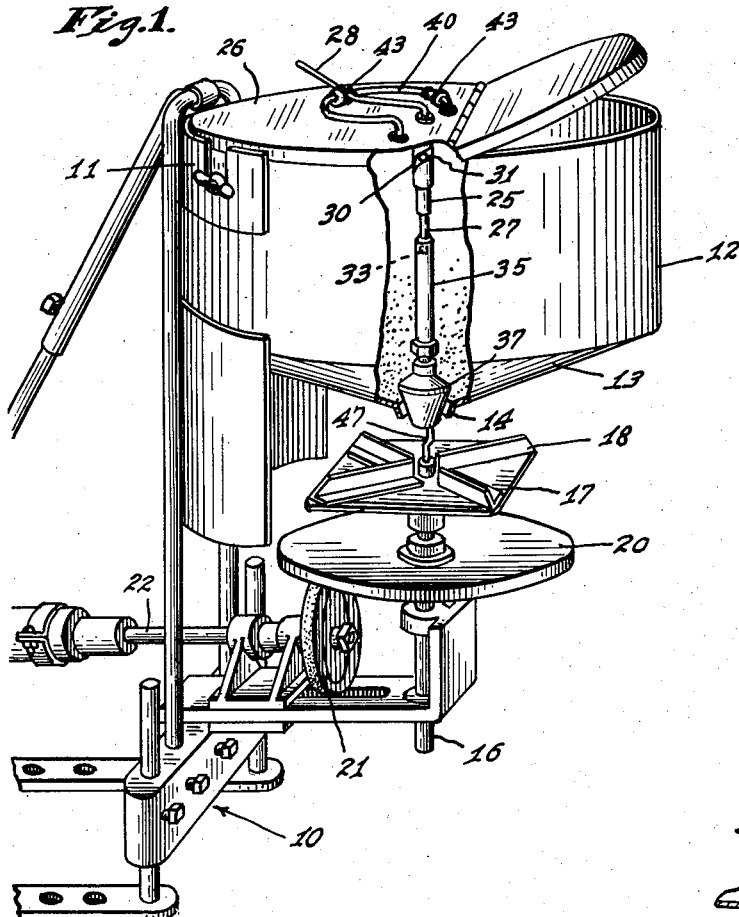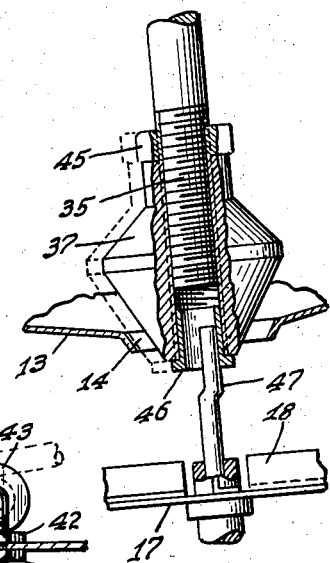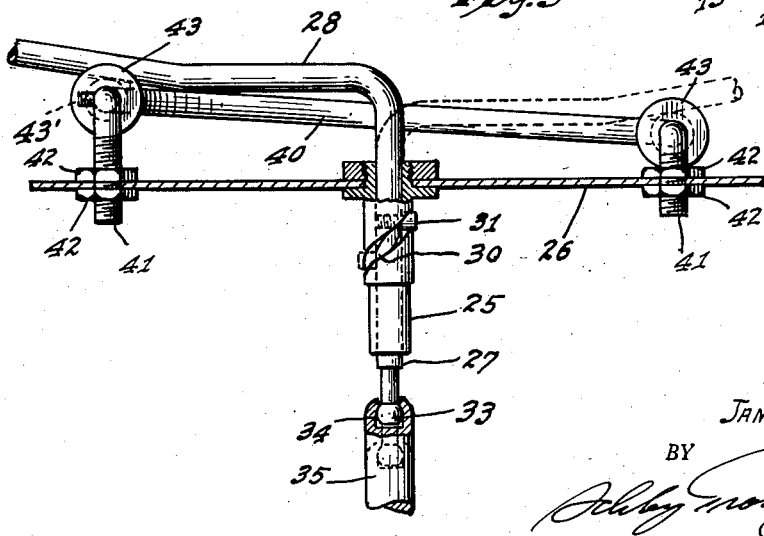

United States Patent Office 2,886,334
Patented May 12, 1959

2,886,334
ROTARY SCATTERER

James L. Presler, Van Wert, Ohio, assignor to Corson Brothers, Inc., a corporation of Indiana Application September 9, 1953, Serial No. 379,117

4 Claims. (Cl. 275—8)

This application, which is a continuation-in-part of my prior application Serial No. 22,127, filed April 20, 1948 (issued as Patent No. 2,652,261, September 15, 1953), relates to a tractor-mounted seeding device for sowing grass, clover, and other seeds. More particularly, the application relates to an improved means for controlling the flow of seed from an elevated hopper onto a distributor plate which spins on a vertical axis and scatters the seed fed to it.

It has heretofore been proposed to control the rate of seed-flow from a hopper through a vertically adjustable frusto-conical valve associated with a circular opening in the bottom wall of the hopper. Through the use of such a valve it has been found possible to control very accurately the rate of seed-discharge; but occasionally, especially at low rates of flow, the seeds have a tendency to bridge the annular feed opening surrounding the valve member and thus to interrupt the flow.

It is an object of this invention to provide a valve means less subject to clogging and interruption of seed-flow than are prior valves of which I am aware. Another object of the invention is to produce a valve which will provide control of seed-flow at different rates.

In carrying out the invention in its preferred form, I provide a seed-hopper having a bottom which slopes to a central, circular discharge opening. From the upper wall of the hopper I support a vertically adjustable rod or shaft which projects downwardly into the hopper where it is connected to a conical valve associated with the discharge opening. The connection between the vertically adjustable rod or shaft and the valve is a loose connection permitting the valve to swing freely in all directions in a manner effective to dislodge any seeds which might tend to lodge in and clog the feed orifice. The inevitable vibration of the seeder which occurs as the vehicle carrying it proceeds over the ground may be relied on to oscillate the valve; but preferably the discharge opening is located above and coaxially with a spinning distributor plate and such plate is provided with an upwardly extending element having an eccentric terminal portion which cooperates with the valve to cause it to oscillate in the discharge opening and prevent any clogging thereof by the emerging seed.

The accompanying drawings illustrate the invention:

Fig. 1 is a perspective view of the complete seeder, a portion of the wall of the seed hopper being broken away to illustrate the valve construction;

Fig. 2 is a fragmental view illustrating the valve and means employed to oscillate it;

Fig. 3 is a vertical section through the upper wall of the hopper illustrating the means employed to adjust the valve;

Fig. 4 is a side elevation partially broken away, of a seed hopper illustrating a modified form of valve and control mechanism;

Fig. 5 is a fragmental plan view of the structure illustrated in Fig. 4; and

Fig. 6 is an elevation, in partial section and on an enlarged scale, showing the valve employed in the construction of Figs. 4 and 5.

The device illustrated in Figs. 1 to 3 embodies a supporting structure designated in its entirety by the reference numeral 10 and adapted for attachment to a farm tractor. Near its top, the supporting structure 10 is provided with an arcuate bracket 11 adapted to support a circular seed-hopper 12 having a conical bottom 13 which slopes to a central outlet opening 14. Below the hopper 12, the supporting structure 10 is provided with bearings which rotatably support a vertical shaft 16 having rigid with it at its upper end a distributor plate 17 provided with radial vanes 18 for scattering the seed fed to the distributor plate through the hopper discharge opening 14. Also secured to the shaft 16 is a friction disc 20 driven from a friction wheel 21 adapted for connection through a shaft 22 to the power take-off of the tractor.

The elements of the seeder so far enumerated are more fully set forth and described in my co-pending application above referred to. The present application relates to an improved means for controlling the flow of seed through the hopper discharge opening 14 onto the spinning distributor plate 17 for scattering by the vanes 18.

In the arrangement shown in Figs. 1 to 3, the valve means comprises a vertical bearing bushing 25 which is secured in any convenient manner to the top wall 26 of the hopper 12. Mounted for rotatable and axial movement in the bushing 25 is a shaft 27 having rigid with it at its upper end a radially extending rod 28. Conveniently, the shaft 27 and arm 28 are the two legs of a rod bent into a general L-shape. The bushing 25 is provided in its wall with a helical slot 30 which receives the head 31 of a screw projecting radially from the shaft 27, so that by operating the arm 28 to rotate the shaft 27, the latter will move axially as well as rotatably in the bearing 25. The lower end of the shaft 27 is provided with a ball 33 receivable in a socket 34 at the upper end of a valve-stem 35. Conveniently, the socket 34 is formed by drilling a hole to the proper depth into the end of the stem 35 and by then spinning or swaging the annular wall of such hole inwardly over the ball 33 after the latter has been inserted into the socket.

To the lower end of the valve stem 35 there is secured a valve member having a frusto-conical lower end adapted to be received in the discharge opening 14 of the hopper. The maximum diameter of the valve 37 is greater than the diameter of the opening 14 so that when the valve is in its lowermost position of adjustment it will completely close such opening. As will be obvious, the valve can be moved upwardly from its lowermost position to provide an annular feed orifice which increases in area as the valve is raised. For a purpose which will hereinafter become apparent the connection 33—34 is a loose connection permitting the valve, when open, to swing freely.

To hold the valve in any desired position of adjustment, I mount on the top wall 26 of the hopper an arcuate member against which the arm 28 bears frictionally. Conveniently, such member is the central portion 40 of a round rod bent to extend in an arc concentric with the shaft 27 but having a helical pitch corresponding to that of the slot 30. The ends 41 of such rod are bent into parallel positions, perpendicular to the plane of the central portion 40 and are screw-threaded. The upper hopper-wall 26 is provided with holes for the reception of the threaded rod-ends 41; and nuts 42 on such rod-ends adjustably secure the latter to the hopper-wall 26. Hence, in any position of the rod 27 above its axis the axial position of the shaft will be determined by the screw-head 31 and the slot 30, the nuts 42 can be adjusted to insure that the arm 28 will bear frictionally on the support 40.

To provide a more positive means for holding the shaft 27 in valve-closing position or in any desired open position, I may mount on the support 40 a pair of spool-like stops 43 each having an annular groove adapted to receive the arm 28. The lower one of such stops may be welded to the rod 40 to hold the arm 28 in valve-closing position, while the other may have a set-screw 43' enabling it to be secured along the rod 40 in any desired position of adjustment. The arm 28 possesses sufficient resilience to permit it to be swung upwardly far enough to enter the groove in either spool.

The valve member 37 is provided with a central screw-threaded opening adapted to receive the screw-threaded lower end of the stem 35. A lock nut 45 is provided to lock the valve 37 in any position of adjustment on the stem. At its lower end the screw-threaded central opening of the valve 37 receives a bushing 46 which in turn receives the upper end of an extension 47 screwed into a central opening in the upper end of the distributor shaft 16. The extreme upper end of the extension 47 is off-set or bent laterally for a short distance for a purpose which will hereinafter be described. The opening in the bushing 46 is preferably just large enough and the eccentricity of the upper ends of the extension 47 just small enough to permit the extension to rotate in the bushing 46 without bearing heavily on the bushing-wall when the valve 37 is closed. An explanation of the manner in which the device of Figs. 1 to 3 operates will be deferred until after another embodiment of the invention has been described.

The valve arrangement shown in Figs. 4, 5, and 6, is that which was disclosed in my prior application above referred to. In that arrangement, a vertical-adjusting shaft 27' is rotatably and axially movable in a bushing 25' secured to the upper wall of the hopper. A pin or screw 31' projecting laterally from the shaft 27' is received in a helical slot in the bushing 25' to cause the shaft 27' to move vertically as it is adjusted about its axis. An arm 28' rotatable with the shaft 27' co-operates with a notched positioning plate 40' to hold the shaft in any desired position of adjustment. Yieldable connecting means 55 permits the outer end of the arm 28' to be raised and lowered relative to the shaft 27' to accommodate its reception in and release from the notches in the plate 40'. A spring 56, acting between the lower end of the bushing 25' and a collar 57 secured to the shaft 27', takes up lost-motion between the pin 31' and the helical slot which receives it.

The frusto-conical valve 60 shown in Figs. 4 and 6 has at its upper and larger end a cylindrical socket 61 adapted to receive loosely the lower end of the shaft 27'. The wall of the socket 61 is provided with diametrically opposite slots, and the lower end of the shaft 27' with a diametrically extending opening, for reception of a pin 62. The inner diameter of the socket 61 is somewhat greater than the diameter of the shaft 27', so that the connection between such shaft and the valve is a loose connection permitting the valve to oscillate under the influence of vibrations transmitted to the seeder from the tractor which carries it. A compression spring 63, acting between the upper end of the socket 61 and a thrust collar 64 secured to the shaft 27', urges the valve 60 downwardly relative to the shaft to maintain the valve closed when the arm 28' is at the one limit of its adjustment on the plate 40'.

When the valve 60 is open, especially if it is open only to a slight extent, there may be a tendency for seeds to arch over the opening or to become jammed therein, thus reducing the effective size of the opening, or perhaps completely occluding it, and interfering with the maintenance of seed-flow at the desired rate. The loose mounting of the valve 60 on the shaft 27' tends to prevent partial or total occlusion of the annular feed orifice; for it permits the valve to oscillate horizontally in the discharge opening as a result of the inevitable vibration of the hopper as the vehicle which carries it proceeds over the ground. Such oscillation of the valve dislodges any seeds which are arched over or jammed in the annular orifice. If desired, the seed-dislodging tendency of the oscillatable valve 60 may be supplemented and augmented by providing in its lower end a recess 65 which receives a heavy ball 66 of smaller diameter, such ball being retained in the recess by a closure-disc 67. The ball 66, both because of its freedom from restraint and its greater range of horizontal movement, may acquire horizontal velocities much greater than that of the valve and will rap the valve sharply and repeatedly to enhance the seed-dislodging action. This action of the ball is particularly advantageous when the valve is open only slightly and its range of horizontal movement is small.

It may frequently happen, especially when the tractor is proceeding over sloping ground with the valve open to only a slight extent, that the valve, instead of swinging freely completely across the discharge opening would tend under the influence of gravity to lie more or less inertly against one side of the opening. Such a condition is shown somewhat exaggeratedly in Fig. 2. In such situations, the arrangement of Figs. 1 to 3 has an advantage over that of Figs. 4 to 6, for the rotating, eccentric end of the extension 47 will repeatedly lift the valve away from that side of the opening against which it tends to lie, thus insuring a state of agitation which prevents clogging of the annular feed orifice. Even when the tractor is operating on the level so that the valve 37 is free to swing freely, the pendulum-like swinging will repeatedly bring the inner wall of the bushing 46 into contact with the rapidly rotating eccentric extension 47, and the valve will be thrown violently radially to produce an effective seed-dislodging action.

The particular valve 37 shown in Figs. 1 and 2 is double-ended, its ends have different tapers, and it is reversible on the stem 35. The valve may be used with either end downward and cooperating with the opening 14, the end of more gradual taper providing a relatively fine adjustment of the size of the feed orifice and the other end providing a relatively coarse adjustment.

I claim as my invention:

1. In a seeder adapted for mounting on a vehicle and having an elevated seed hopper provided with an outlet opening discharging downwardly onto a distributor plate which rotates about a vertical axis, a shaft mounted for vertical adjustment above and in alignment with said opening, a valve stem, a universal joint connecting the upper end of said valve stem with the lower end of said shaft whereby the valve stem, while free to swing freely, may be moved vertically with said shaft, a frustoconical valve mounted on said stem for cooperating with said opening to regulate the rate of seed-feed therethrough, said valve being provided at its lower end with an opening, and a shaft projecting upwardly from and rotatable with said distributor plate, said shaft having an eccentric upper end loosely received in said valve-opening and operative to cause said valve, when open, to oscillate in said outlet opening.

2. In a seeder adapted for mounting on a vehicle and having an elevated seed hopper provided with an outlet opening discharging downwardly onto a distributor plate which rotates about a vertical axis, a shaft mounted for vertical adjustment above and in alignment with said opening, a valve stem, a universal joint connecting the upper end of said valve stem with the lower end of said shaft whereby the valve stem, while free to swing freely, may be moved vertically with said shaft, a frustoconical valve mounted on said stem for cooperating with said opening to regulate the rate of seed-feed therethrough, and a member rotatable with said distributor plate and engageable with said valve to cause the latter, when open, to oscillate transversely of said opening.

3. In a seeder adapted for mounting on a vehicle and having an elevated seed hopper provided with an outlet opening discharging downwardly onto a distributor plate which rotates about a vertical axis, a shaft mounted for vertical adjustment above and in alignment with said opening, a valve cooperating with said opening and connected to said shaft for vertical movement therewith but free to move transversely of said outlet opening relative to said shaft when in open position, and means jointly operable with said distributor plate for oscillating said valve transversely of said opening when the valve is open.

4. The invention set forth in claim 1 with the addition that said valve stem is screw-threaded, said valve having an axial screw-threaded bore receiving the lower end of the valve stem, and a bushing screw-threadedly mounted in the lower end of said bore and having an opening receiving said eccentric shaft-end.

References Cited in the file of this patent

UNITED STATES PATENTS

| | | |
|---|---|---|
| 476,138 | Evans | May 31, 1892 |
| 883,564 | Parrish | Mar. 31, 1908 |
| 1,044,958 | West | Nov. 19, 1912 |
| 1,727,056 | Gebhart | Sept. 3, 1929 |
| 1,743,983 | Seltzer | Jan. 14, 1930 |
| 2,169,779 | Loewe | Aug. 15, 1939 |
| 2,547,143 | Speicher | Apr. 3, 1951 |
| 2,553,403 | Cory | May 15, 1951 |
| 2,569,085 | Wood et al. | Sept. 25, 1951 |
| 2,652,261 | Presler | Sept. 15, 1953 |